United States Patent
Horioka et al.

(10) Patent No.: US 6,865,156 B2
(45) Date of Patent: Mar. 8, 2005

(54) BANDWIDTH CONTROL METHOD, CELL RECEIVING APPARATUS, AND TRAFFIC CONTROL SYSTEM

(75) Inventors: Kazuyuki Horioka, Chiba (JP); Satoshi Furusawa, Chiba (JP); Hideki Ohashi, Tokyo (JP); Haruki Uchida, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 817 days.

(21) Appl. No.: 09/876,918

(22) Filed: Jun. 11, 2001

(65) Prior Publication Data

US 2004/0202175 A1 Oct. 14, 2004

(30) Foreign Application Priority Data

Jun. 15, 2000 (JP) .......................... 2000-179271

(51) Int. Cl.[7] ................ H04J 3/14; H04J 3/16
(52) U.S. Cl. ..................... 370/236.1; 370/468
(58) Field of Search ............... 370/230–236.2, 370/238, 249–250, 252–253, 395.1, 396, 395.2, 397, 395.43, 398–399, 410, 412, 428–429, 465, 468, 477, 431, 433, 437; 709/232–235, 238

(56) References Cited

U.S. PATENT DOCUMENTS

| | | | | |
|---|---|---|---|---|
| 5,946,324 A | * | 8/1999 | Mishra et al. | 370/468 |
| 6,088,359 A | * | 7/2000 | Wicklund et al. | 370/236.1 |
| 6,094,418 A | * | 7/2000 | Soumiya et al. | 370/231 |
| 6,438,107 B1 | * | 8/2002 | Somiya et al. | 370/234 |
| 6,466,545 B1 | * | 10/2002 | Watanabe | 370/232 |
| 6,570,854 B1 | * | 5/2003 | Yang et al. | 370/236.1 |
| 2001/0053127 A1 | * | 12/2001 | Horioka et al. | 370/232 |
| 2004/0202175 A1 | * | 10/2004 | Horioka et al. | 370/395.1 |

* cited by examiner

Primary Examiner—Duc Ho
Assistant Examiner—Phuongchau Ba Nguyen
(74) Attorney, Agent, or Firm—Venable LLP; Michael A. Sartori

(57) ABSTRACT

In a communication network in which a group of connections has an assigned group bandwidth and each connection in the group has a minimum bandwidth, bandwidth usage is controlled by calculating the total current bandwidth allowed to the group, subtracting the total current bandwidth from the assigned group bandwidth, and adding the difference to each connection's current bandwidth allowance to calculate an explicit rate, according to which the connection's bandwidth allowance is controlled. The explicit rate is altered to a minimum explicit rate when, for example, the total bandwidth exceeds the group bandwidth. The minimum explicit rate of each connection is preferably calculated on the basis of the sum of the minimum bandwidths of the active connections in the group. These measures improve the fairness of bandwidth usage control.

34 Claims, 8 Drawing Sheets

FIG. 6

| PARAMETER | ① | | | | ② | | | | ③ | | | | ④ | | | |
|---|---|---|---|---|---|---|---|---|---|---|---|---|---|---|---|---|
| IR(M)    | 0  | 0  | 0  | 0  | 1 | 2 | 3 | 4 | 1 | 2 | 3 | 0 | 6 | 2 | 3 | 0 |
| CCR(M)   | 0  | 0  | 0  | 0  | 1 | 2 | 3 | 4 | 1 | 2 | 3 | 0 | 5 | 2 | 3 | 0 |
| ECR0(M)  | 1  | 2  | 3  | 4  | 1 | 2 | 3 | 4 | 1 | 2 | 3 | 4 | 1 | 2 | 3 | 4 |
| ECR(M)   | 10 | 10 | 10 | 10 | 1 | 2 | 3 | 4 | 5 | 6 | 7 | 4 | 5 | 2 | 3 | 4 |

| PARAMETER | ⑤ | | | | ⑥ | | | | ⑦ | | | |
|---|---|---|---|---|---|---|---|---|---|---|---|---|
| IR(M)    | 6 | 5 | 3 | 0 | 6 | 5 | 3 | 0 | 6 | 5 | 3 | 0 |
| CCR(M)   | 5 | 2 | 3 | 0 | 5 | 2 | 3 | 0 | 5 | 2 | 3 | 0 |
| ECR0(M)  | 1 | 2 | 3 | 4 | 1 | 2 | 3 | 4 | 1 | 2 | 3 | 4 |
| ECR(M)   | 5 | 2 | 3 | 4 | 5 | 2 | 3 | 4 | 5 | 2 | 3 | 4 |

FIG. 7

| PARAMETER | ① | | | | ② | | | | ③ | | | | ④ | | | |
|---|---|---|---|---|---|---|---|---|---|---|---|---|---|---|---|---|
| IR(M) | 0 | 0 | 0 | 0 | 1 | 2 | 3 | 4 | 1 | 2 | 3 | 0 | 6 | 2 | 3 | 0 |
| CCR(M) | 0 | 0 | 0 | 0 | 1 | 2 | 3 | 4 | 1 | 2 | 3 | 0 | 5 | 2 | 3 | 0 |
| ECR0(M) | 10 | 10 | 10 | 10 | 1 | 2 | 3 | 4 | 1.67 | 3.33 | 5 | 6.67 | 1.67 | 3.33 | 5 | 6.67 |
| ECR(M) | 10 | 10 | 10 | 10 | 1 | 2 | 3 | 4 | 5 | 6 | 7 | 6.67 | 5 | 3.33 | 5 | 6.67 |

| | ⑤ | | | | ⑥ | | | | ⑦ | | | |
|---|---|---|---|---|---|---|---|---|---|---|---|---|
| | 6 | 5 | 3 | 0 | 6 | 5 | 3 | 0 | 6 | 5 | 3 | 0 |
| | 5 | 3.33 | 3 | 0 | 5 | 3.33 | 3 | 0 | 3.67 | 3.33 | 3 | 0 |
| | 1.67 | 3.33 | 5 | 6.67 | 1.67 | 3.33 | 5 | 6.67 | 1.67 | 3.33 | 5 | 6.67 |
| | 1.67 | 3.33 | 5 | 6.67 | 3.67 | 5.33 | 5 | 6.67 | 3.67 | 3.33 | 5 | 6.67 |

FIG. 8

| PARAMETER | ① | | | ② | | | | ③ | | | | ④ | | | |
|---|---|---|---|---|---|---|---|---|---|---|---|---|---|---|---|
| IR(M) | 0 | 0 | 0 | 1 | 2 | 3 | 4 | 1 | 2 | 3 | 0 | 6 | 2 | 3 | 0 |
| CCR(M) | 0 | 0 | 0 | 1 | 2 | 3 | 4 | 1 | 2 | 3 | 0 | 5 | 2 | 3 | 0 |
| ECR0(M) | 10 | 10 | 10 | 1.67 | 3.33 | 5 | 4 | 1.67 | 3.33 | 5 | 4 | 1.67 | 3.33 | 5 | 4 |
| ECR(M) | 10 | 10 | 10 | 1 | 2 | 3 | 4 | 5 | 6 | 7 | 4 | 5 | 3.33 | 5 | 4 |

| PARAMETER | ⑤ | | | | ⑥ | | | | ⑦ | | | |
|---|---|---|---|---|---|---|---|---|---|---|---|---|
| IR(M) | 6 | 5 | 1.67 | 1.67 | 6 | 1.67 | 1.67 | 3.67 | 6 | 3.67 | 1.67 | 3.67 |
| CCR(M) | 5 | 3.33 | 3.33 | 3.33 | 5 | 3.33 | 3.33 | 5.33 | 5 | 3.33 | 3.33 | 3.33 |
| ECR0(M) | 6 | 3 | 5 | 5 | 3 | 3 | 5 | 5 | 3 | 3 | 5 | 5 |
| ECR(M) | 0 | 0 | 4 | 4 | 0 | 0 | 4 | 4 | 0 | 0 | 4 | 4 |

BANDWIDTH CONTROL METHOD, CELL RECEIVING APPARATUS, AND TRAFFIC CONTROL SYSTEM

BACKGROUND OF THE INVENTION

The present invention relates to a cell receiving apparatus and traffic control system suitable, for example, for control of available-bit-rate traffic in a communication network employing the asynchronous transfer mode.

The asynchronous transfer mode (ATM) provides various service categories, so that the user can select the type of service best suited for the type of data to be transmitted (audio data, video data, various other types of data, or a mixture thereof). Available bit rate (ABR) is one of the service categories. In ABR service, a minimum cell rate and a peak cell rate are established for a connection, and the network tries to provide the best quality of service for as much traffic as it can handle within these limits. ABR service is managed by the use of resource management (RM) cells, which are sent between the source and destination nodes (including virtual source and virtual destination nodes) in the connection. Traffic management enables ABR connections to be kept operating despite cell traffic fluctuations and variations in the availability of bandwidth and other network resources.

Incidentally, an ATM cell is a fixed-length data packet, so cell rate is synonymous with bandwidth.

Various methods of ABR traffic management by ATM switches have been proposed. One of the main methods specifies an explicit cell rate (ECR) in the RM cells, and is known as ECR marking. The terms explicit rate (ER) and ER marking are also used, but the acronym ECR will be employed herein.

In the conventional ECR marking system, when a source node sends cells to a destination node through an ATM switch, the source node periodically inserts RM cells in the cellstream, specifying a desired cell rate in the ECR field. The ATM switch, operating as a virtual destination (VD), receives the RM cells, modifies various information in them, and returns them to the source node. One of the modified values may be the ECR value, which the switch reduces if the desired rate is too high to allow. The source node updates its allowable cell rate according to the ECR value specified by the switch.

A similar control scheme is employed on the path between the ATM switch and the destination node, the ATM switch acting as a virtual source (VS).

The problem in ECR marking is how the ATM switch should calculate the ECR value for each connection. Needless to say, the calculation must take account of the current cell rates of other connections sharing the same path or the same ATM switch resources. ATM standards organizations have not recommended a generic algorithm for ECR calculation. Several algorithms have been proposed, but the proposed algorithms leave room for improvement in regard to fairness and adaptability to changing communication conditions.

SUMMARY OF THE INVENTION

An object of the present invention is to control bandwidth usage by different connections in a group fairly.

The invented method of controlling bandwidth usage applies to a group of connections having an assigned group bandwidth, in which the individual connections have minimum bandwidths. The method includes the steps of:

calculating the total bandwidth that the connections in the group are currently allowed to use;

subtracting this total bandwidth from the assigned group bandwidth;

calculating an explicit rate for one connection in the group by adding the resulting difference to the connection's current bandwidth allowance; and controlling the current bandwidth allowance of the one connection according to the explicit rate.

One aspect of the invented method includes the further steps of:

determining which connections in the group are currently active;

calculating a minimum explicit rate for the above-mentioned one connection on the basis of a sum of the minimum bandwidths of the active connections in the group; and altering the explicit rate to the minimum explicit rate under certain conditions.

Another aspect of the invented method includes the further steps of:

calculating a minimum explicit rate for the above-mentioned one connection; and altering the explicit rate to the minimum explicit rate if the above-mentioned difference is negative.

The first aspect provides enhanced fairness by taking connection activity into account when calculating minimum explicit rates. The second aspect provides enhanced fairness by resetting the explicit rate to the minimum rate whenever total bandwidth usage exceeds the group bandwidth. Both aspects of the invention can be used in combination.

The invention also provides a cell receiving apparatus and traffic control system employing the invented method.

BRIEF DESCRIPTION OF THE DRAWINGS

In the attached drawings:

FIG. 6 illustrates the behavior of an ABR connection group over a period of time with a conventional method of explicit rate calculation;

FIGS. 7 and 8 illustrate the behavior of the same ABR connection group with invented methods of explicit rate calculation.

DETAILED DESCRIPTION OF THE INVENTION

Figure 1:
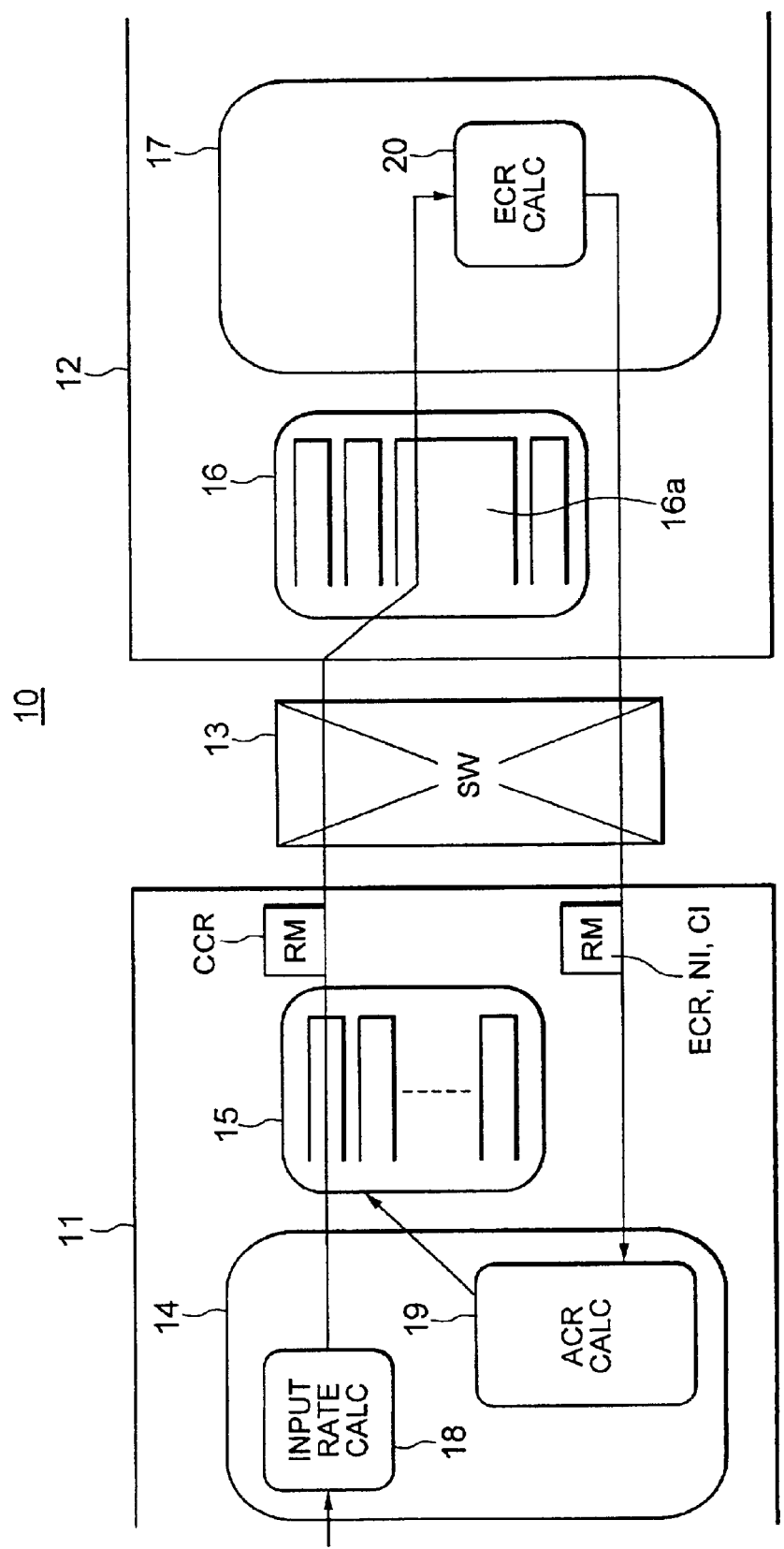
FIG. 1 is a block diagram of an ATM switch embodying the present invention.

ATM switches embodying the invention will be described with reference to the attached drawings, in which like parts are indicated by like reference characters.

Referring to FIG. 1, the first embodiment is an ATM switch 10 comprising an input line interface 11, an output line interface 12, and a switching apparatus (SW) 13. The input line interface 11 functions as a cell transmitting apparatus, transmitting cells into the switching apparatus 13. The output line interface 12 functions as a cell receiving apparatus, receiving cells from the switching apparatus 13. The input line interface 11 comprises an input ABR control unit 14 and a virtual channel shaper (VCS) 15. The input ABR control unit 14 includes an input rate calculation unit (CALC) 18 and an allowed cell rate (ACR) calculation unit 19. The output line interface 12 comprises a virtual path shaper (VPS) 16 and an output ABR control unit 17. The output ABR control unit 17 includes an explicit cell rate (ECR) calculation unit 20. The two ABR control units 14, 17 constitute an ABR traffic control system.

Figure 2:
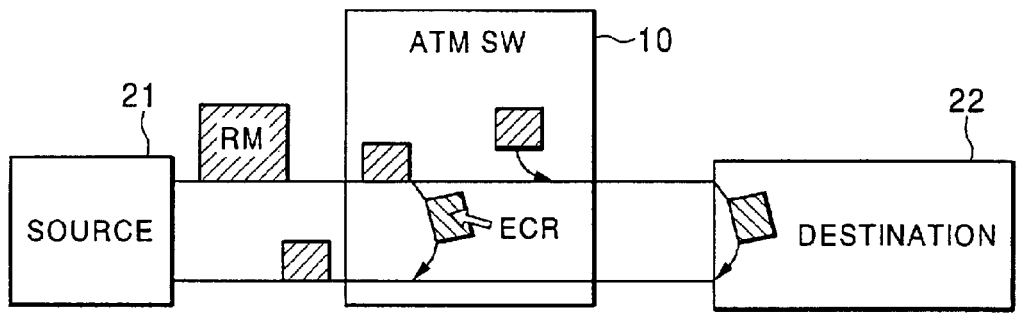
FIG. 2 is a simplified diagram showing a connection through the ATM switch in FIG. 1.

Referring to FIG. 2, the ATM switch 10 establishes a connection between a source node 21 and a destination node 22 in an ATM communication network. The connection is defined by, for example, a virtual path identifier (VPI) and a virtual channel identifier (VCI), which are placed in the headers of the cells transmitted on the connection. Normally, the ATM switch 10 handles many connections simultaneously. Only ABR connections will be dealt with below.

In an ABR connection, the source node 21 sends data cells (not visible) and RM cells to the ATM switch 10. The ATM switch 10 sends the data cells onward to the destination node 22, and sends the RM cells back to the source node 21, adding a calculated explicit cell rate (ECR) indication. The ATM switch 10 also sends the destination node 22 new RM cells, which the destination sends back with suitable modifications. By generating and returning RM cells in this way, the ATM switch 10 operates as a virtual source and virtual destination.

In addition to sending and receiving the RM cells shown in FIG. 2, the ATM switch 10 generates RM cells that it uses internally for traffic control, as described below.

Referring again to FIG. 1, the input rate calculation unit 18 calculates the input rate (IR) of each ABR connection according to the rate at which cells are actually received.

The allowable cell rate calculation unit 19 calculates an allowable cell rate (ACR) for each ABR connection, notifies the virtual channel shaper 15 of the calculated ACR values, and places the ACR values in RM cells sent to the output line interface unit 12, in the current cell rate (CCR) octet of these RM cells. The current cell rate octet indicates the amount of bandwidth a connection is currently allowed to transmit through the switching apparatus 13. Methods of calculating the allowable cell rate will be described later.

The virtual channel shaper 15 maintains a separate queue for each ABR connection, stores arriving ABR cells in the corresponding queues, and takes cells from each queue at a rate limited by the corresponding ACR value supplied by the allowable cell rate calculation unit 19, thereby shaping the ABR cell traffic transmitted into the switching apparatus 13. The virtual channel shaper 15 also generates and transmits RM cells for each ABR connection.

The switching apparatus 13 switches the cell traffic according to header information in the incoming cells.

The virtual path shaper 16 maintains a separate queue for each service class, and provides traffic shaping on a service-class basis. At least one of the queues is an ABR queue 16a. The connections sharing a single ABR queue in the virtual path shaper 16 will be referred to as an ABR connection group. There may be, for example, a separate ABR queue and thus a separate ABR connection group for each virtual path, but for simplicity, only one ABR queue 16a and one ABR connection group will be considered below. Cells belonging to ABR connections in the ABR connection group are placed in the ABR queue 16a, then taken from the ABR queue 16a and transmitted toward their various destinations.

Each ABR connection group has an assigned group bandwidth Bg that specifies the rate at which cells can be taken from its ABR queue. Bg represents the bit rate available for use by the ABR connection group. Control of this bit rate is one form of shaping of the outgoing ABR traffic.

The output ABR control unit 17 receives RM cells taken from the ABR queue 16a, adds information to them or alters information in them, and returns the RM cells to the input line interface 11. The explicit cell rate calculation unit 20 is one of several units in the output ABR control unit 17 that manipulate the information in the RM cells (the other units are not shown). When the explicit cell rate calculation unit 20 receives an RM cell, it calculates an explicit cell rate (ECR) for the connection to which the RM cell belongs. The explicit cell rate represents the maximum share of the bandwidth Bg that can be used by the connection. The ECR calculation procedure will be described later. The ECR value is written into an ECR octet in the RM cell, which is then sent back through the switching apparatus 13 to the input ABR control unit 14.

Next, the operation of the ATM switch 10 will be described. The description will be limited to the management of ABR traffic.

Incoming ABR data cells are counted by the input rate calculation unit 18, enqueued in the virtual channel shaper 15, dequeued at the allowable cell rates calculated by the allowable cell rate calculation unit 19, and sent into the switching apparatus 13. Emerging from the switching apparatus 13, they are placed in the ABR queue 16a in the virtual path shaper 16, dequeued at a rate limited by the assigned ABR bandwidth Bg, and sent onward toward their destinations.

For each ABR connection, the virtual channel shaper 15 generates RM cells according to a predetermined rule: for example, at predetermined time intervals, or at intervals of a predetermined number of ABR data cells. As noted above, each RM cell includes a current cell rate (CCR) value equal to the allowable cell rate calculated by the allowable cell rate calculation unit 19. The RM cells generated by the virtual channel shaper 15 may be supplemented by RM cells received from the source node, but the ATM switch 10 does not rely on the source node to supply RM cells.

The allowable cell rate calculation unit 19 calculates the allowable cell rate when it receives an RM cell from the output line interface 12. The allowable cell rate can be calculated in various ways from some or all of the following (and other) information: the peak cell rate (PCR), the minimum cell rate (MCR), the input rate (IR), the explicit cell rate (ECR), a no increase (NI) bit, and a congestion indication (CI) bit. The NI and CI bits, like the ECR information, are included in RM cells received from the output ABR control unit 17. The minimum cell rate (MCR) of a connection is a minimum bandwidth that the ATM switch 10 is capable of providing to the connection within the group bandwidth Bg. The minimum cell rate and peak cell rate are fixed values established when the connection is set up.

Three preferred methods of ACR calculation will be described next.

In the first preferred method, the ACR value is calculated by an equation (1) given below, regardless of whether the connection is currently active or inactive. This method is applicable when, for example, the minimum cell rate of a connection is zero.

Figure 3:
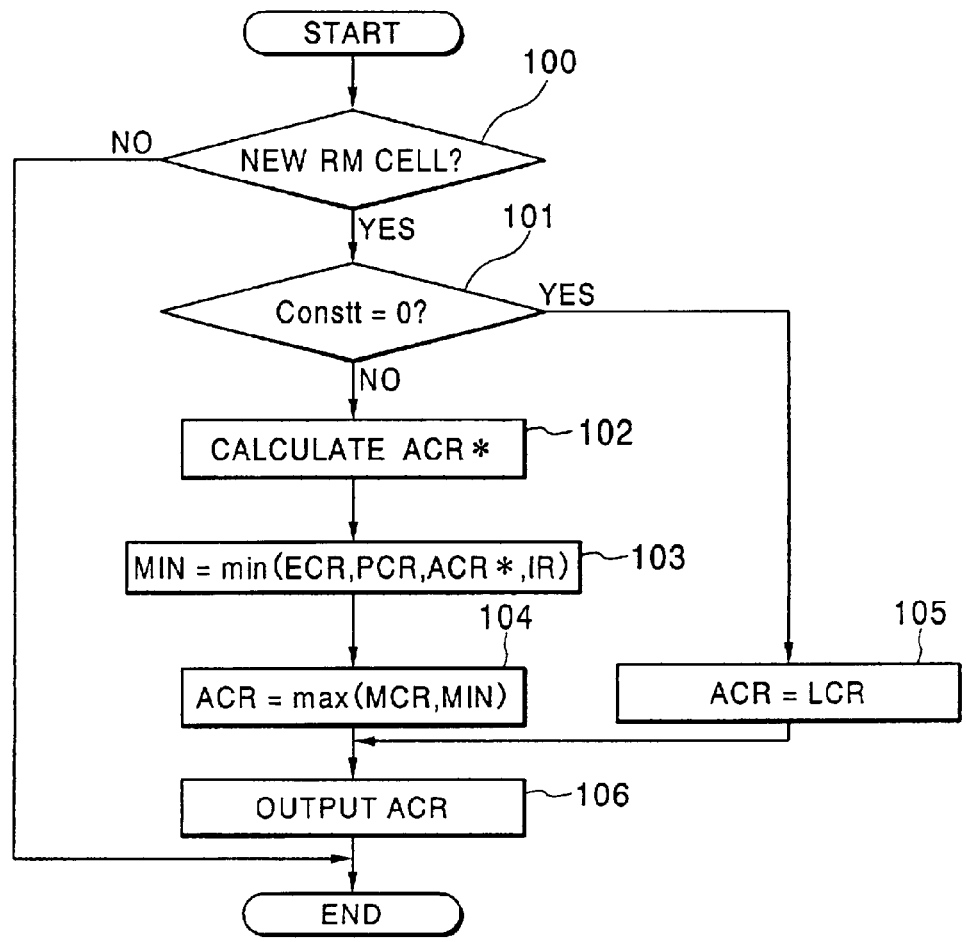
FIG. 3 is a flowchart illustrating a method of calculating an allowable cell rate.

In the second preferred method, the ACR value is calculated by the process illustrated in flowchart form in FIG. 3. This process is executed at regular intervals, such as once per cell interval. It makes use of a connection status flag (Connstt) that indicates whether the connection is currently active or inactive, being set to '1' to indicate activity (active cell traffic), and cleared to '0' to indicate inactivity. Connstt is set and cleared by the input rate calculation unit 18, for example, according to the input rate IR. Alternatively, Connstt may be set and cleared according to the presence or absence of cells in the corresponding queue in the virtual channel shaper 15.

The first step is to decide whether a new RM cell has been received from the output line interface 12 (step 100). The process ends if a new RM cell has not been received.

Next, the Connstt flag is checked (step 101). If Connstt is set to '1,' indicating that the connection is active, then the ACR value is calculated in steps 102 to 104. If Connstt is cleared to '0,' indicating that the connection is inactive, then the ACR value is calculated in step 105.

If the connection is active, the allowable cell rate calculation unit 19 calculates a candidate cell rate ACR* according to, for example, congestion information such as the NI and CI bits mentioned above (step 102). A recommended method of calculating ACR* is given in section 5.10.4 (Source Behavior) of the ATM Forum Traffic Management Specification Version 4. This calculation often produces an ACR* value that is too high in view of the connection's peak cell rate (PCR), explicit cell rate (ECR), or current input rate (IR), or is too low in view of the connection's minimum cell rate (MCR). Accordingly, the minimum (MIN) of the ECR, PCR, ACR*, and IR values is taken (step 103); then the maximum (max) of the MCR and MIN values is taken as the ACR value (step 104). The entire calculation is summarized in the following equation (1).

$$ACR=\max\{MCR, \min(ECR, PCR, ACR^*, IR)\} \quad (1)$$

If the connection is inactive, the ACR value is set equal to a predetermined lowest cell rate LCR (step 105). The LCR value is lower than the MCR value. The same LCR value may be used for all ABR connections, or different LCR values may be assigned to different ABR connections.

Finally, the ACR value obtained in step 104 or step 105 is output to the virtual channel shaper 15 (step 106). This output step is performed regardless of whether or not the connection is active.

An advantage of this method of ACR calculation is that when a connection is inactive, its ACR value is forced to the lowest cell rate, and an amount of bandwidth equal to the difference between the lowest cell rate and the minimum cell rate (MCR-LCR) is freed up for distribution to other ABR connections.

Figure 4:
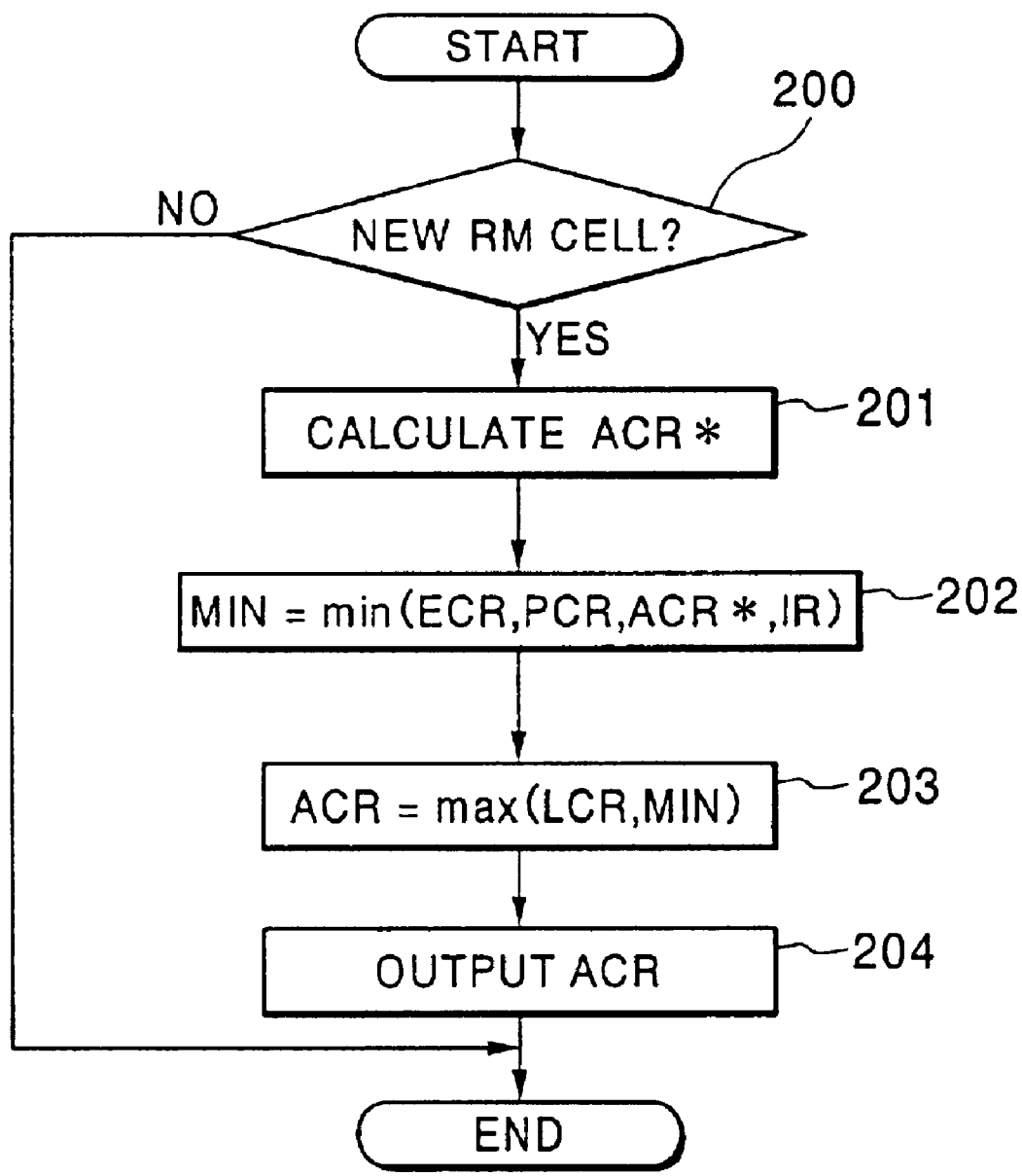
FIG. 4 is a flowchart illustrating another method of calculating an allowable cell rate.

In the third preferred method, the ACR value is calculated by the process illustrated in FIG. 4. The allowable cell rate calculation unit 19 waits for an RM cell to arrive from the output line interface 12 (step 200), calculates a candidate ACR* value as described above (step 201), calculates the minimum (MIN) of the ECR, PCR, ACR*, and IR values as described above (step 202), then takes the maximum of the MIN and LCR values as the ACR value (step 203) and outputs the ACR value to the virtual channel shaper 15 (step 204) The entire calculation is summarized in the following equation (2).

$$ACR=\max\{LCR, \min(ECR, PCR, ACR^*, IR)\} \quad (2)$$

As in the second preferred method, LCR is a predetermined value less than the minimum cell rate (MCR).

In the third preferred method, when the input rate (IR) of a connection is less than the minimum cell rate (MCR), the allowable cell rate is reduced to the input rate, or to the lowest cell rate (LCR), instead of to the minimum cell rate, freeing up the difference (MCR-IR or MCR-LCR) for distribution to more active ABR connections.

The second and third preferred methods are applicable when the minimum cell rate (MCR) of a connection is not zero.

After being processed in the switching apparatus 13, RM cells, like ABR data cells, are queued in the virtual path shaper 16. Upon being dequeued, they are processed by the output ABR control unit 17, which adds information such as the above-mentioned congestion indication bit CI and no increase bit NI, and the explicit cell rate ECR. After this processing, the RM cells are returned to the input line interface 11.

Figure 5:
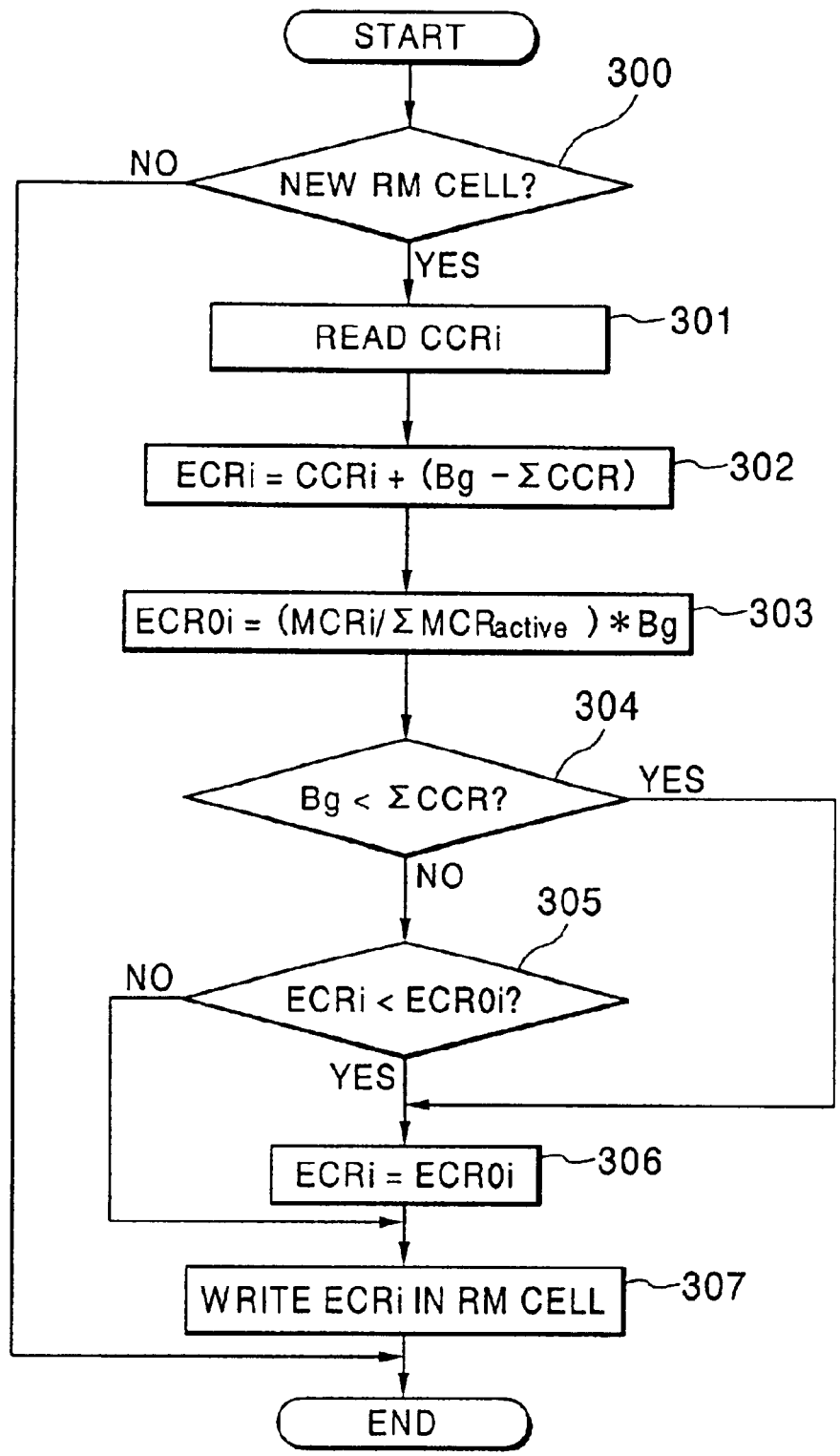
FIG. 5 is a flowchart illustrating the invented method of explicit rate calculation.

In the first embodiment, the explicit cell rate calculation unit 20 in the output ABR control unit 17 calculates the ECR value by the process illustrated in FIG. 5. The explicit cell rate calculation unit 20 executes this process at regular intervals, such as once per cell interval.

The first step is to decide whether a new RM cell has been received from the virtual path shaper 16 (step 300). The process ends if a new RM cell has not been received.

If a new RM cell has been received, its header is read to determine which ABR connection it belongs to. The connection will be denoted below by the letter i. The CCR octet of the cell is also read to determine the current cell rate CCRi of this connection (step 301).

Next, the explicit cell rate calculation unit 20 subtracts the sum of the current cell rates of all connections in the ABR connection group, that is, the total current cell rate of the group, from the bandwidth Bg allocated to the ABR connection group, and adds the resulting positive or negative difference to the CCRi value to obtain a provisional ECR value ECRi (step 302). This value is given by equation (3) below.

$$ECRi=CCRi+(Bg-\Sigma CCR) \quad (3)$$

The explicit cell rate calculation unit 20 also calculates a minimum explicit cell rate ECR0i to be guaranteed for connection i, by dividing the minimum cell rate MCRi of connection i by the sum of the minimum cell rates MCR of all connections in the ABR connection group that are currently active, and multiplying the quotient by the group bandwidth Bg (step 303). The activity status of the connections is determined from, for example, the Connstt flag mentioned earlier. The ECR0i value, which can be interpreted as a minimum fair share of the bandwidth Bg, is given by equation (4) below, in which the asterisk indicates multiplication.

$$ECR0i=(MCRi/\Sigma MCR_{active})^*Bg \quad (4)$$

The group bandwidth Bg is now compared with the total current cell rate of the ABR connection group, that is, with the sum of the CCR values in the group (step 304). If the Bg value is smaller than this total current cell rate, indicating that the ABR connection group is being allowed to transmit too much cell traffic, the following step 305 is skipped.

If the Bg value is equal to or greater than the total current cell rate, the provisional explicit cell rate ECRi is compared with the minimum explicit cell rate ECR0i (step 305).

If the provisional explicit cell rate ECRi is less than the minimum explicit cell rate ECR0i, or the Bg value is less than the total current cell rate, then the explicit cell rate ECRi is altered to the minimum explicit cell rate ECR0i (step 306). Otherwise, the explicit cell rate ECRi is left unaltered; that is, the provisional explicit cell rate is used.

Finally, the explicit cell rate ECRi is written into the received RM cell (step 307), and this cell is sent back to the input ABR control unit 14, where it is used in setting the allowed cell rate of connection i for the next interval.

A particular feature of the explicit cell rate calculation method illustrated in FIG. 5 is that it takes into account the activity status of each ABR connection. Specifically, the minimum explicit cell rate ECR0i is calculated from the minimum cell rates of the active ABR connections. This prevents bandwidth from being needlessly denied to an active connection because an inactive connection has a non-zero minimum cell rate, which it is not using at the moment. The fairness of the bandwidth allocation is thereby improved.

When the group bandwidth Bg is being over-utilized (Bg<ΣCCR), the explicit cell rate calculation unit 20 reduces the explicit cell rates in a fair manner, by allocating the bandwidth Bg to the connections that are currently active, without holding bandwidth in reserve for inactive connections. In other words, each time congestion occurs, the competition for bandwidth is reopened to the active connections. This allows the bandwidth control loop to respond to variations in connection activity in real time.

The effect of the first embodiment will be demonstrated through comparison with a conventional method in which the minimum explicit cell rate ECR0i is calculated by using the sum of the minimum cell rates of all connections in the ABR connection group, whether active or not. This conventional method calculates the explicit cell rate ECRi by the following equations (5) and (6).

$$ECRi = CCRi + (Bg - \Sigma CCR) \quad (5)$$

$$ECRi = \max(ECRi, ECR0i) \quad (6)$$

The comparison will be illustrated for an ABR connection group with four connections (a, b, c, d) with the peak cell rates and minimum cell rates given in megabits per second (Mbps) in Table 1.

TABLE 1

| Connection | a | b | c | d |
|---|---|---|---|---|
| PCR (Mbps) | 10 | 10 | 10 | 10 |
| MCR (Mbps) | 1 | 2 | 3 | 4 |

The group bandwidth of the ABR connection group is ten megabits per second (Bg=10 Mbps), the same as the peak cell rate of each connection in the group. The group bandwidth Bg is also equal to the sum of the four minimum cell rates, a consequence of negotiations made when the connections were set up.

FIG. 6 shows the behavior of the connection group over a period of seven arbitrary time intervals. The input rate IR, current cell rate CCR, explicit cell rate ECR, and minimum explicit cell rate ECR0 of each connection are given in megabits per second (M) for each interval. For simplicity, it will be assumed below that the intervals have a length of one second, and that RM cells are generated for all connections once per second, in a-b-c-d order.

In the first second (1), all four connections are inactive, their input rates and current cell rates being zero. Their minimum explicit cell rates (ECR0) are equal to their minimum cell rates (MCR). At the end of this second, using equations (5) and (6), the explicit cell rate calculation unit 20 calculates an explicit cell rate of ten megabits per second (10M), equal to Bg, for each connection.

Since the minimum explicit cell rates are independent of connection activity, the minimum explicit cell rates will remain constant over the subsequent intervals.

In the next second (2), all four connections begin transmitting at their minimum cell rates. At the end of this second, using equation (5), the explicit cell rate calculation unit 20 reduces the explicit cell rates to these minimum rates.

In the third second (3), the fourth connection (d) becomes inactive, freeing up 4M of bandwidth. This excess bandwidth is added to the explicit cell rates of each of the other three connections (a, b, c); their explicit cell rates become 5M, 6M, and 7M, respectively.

In the fourth second (4), the input rate of the first connection (a) rises to six megabits per second (6M). Since its explicit cell rate (ECRa) is only 5M, only five of the six megabits are sent through the switching apparatus 13, the remaining megabit being buffered in the virtual channel shaper 15. The current cell rate (CCRa) of this connection (a) becomes 5M, absorbing all of the excess bandwidth. At the end of this second, the explicit cell rate (ECRa) of this connection (a) is again set to 5M, while the explicit cell rates of the other connections are set at their minimum cell rates, since there is now no excess bandwidth to add.

In the fifth second (5), the input rate of the first connection (a) remains 6M, and the input rate of the second connection (b) rises to 5M. The current cell rates of these two connections are limited by the explicit cell rates determined in the previous second, so while the first connection (a) is allowed a 5M current cell rate (CCRa), the second connection (b) is restricted to a 2M current cell rate (CCRb).

This condition now becomes self-perpetuating. In the next two seconds (6), (7), the first and second connections (a, b) continue to generate input cells at rates of 6M and 5M, respectively, but while 5M of the traffic on the first connection (a) is transmitted through the ATM switch, only 2M of the traffic on the second connection (b) is transmitted.

FIG. 7 illustrates the behavior of the first embodiment for the same ABR connection group, with the same input traffic conditions. In the first second (1), no connections are active. By default, their minimum explicit cell rates are set to the peak cell rate of 10M, so their explicit cell rates are also 10M.

In the next second (2), in which the connections transmit at their minimum cell rates, the explicit cell rates and minimum explicit cell rates are set equal to these minimum cell rates.

In the third second (3), when the fourth connection (d) becomes inactive, the minimum explicit cell rates are recalculated according to equation (4) above, and are thus increased. The sum of the minimum cell rates of the active connections is now only six megabits per second (1M+2M+3M=6M). As minimum explicit cell rates, the four connections (a, b, c, d) receive, respectively, one-sixth (10M×1/6=1.67M), two-sixths (10M×2/6=3.33M), three-sixths (10M×3/6=5M), and four-sixths (10M×4/6=6.67M) of the bandwidth Bg (10M). The explicit cell rates of the first three connections (a, b, c) become 5M, 6M, 7M, respectively, while the inactive connection (d) receives its minimum explicit cell rate (6.67M).

In the fourth second (4), when the input rate (IRa) of the first connection (a) rises to 6M and its current cell rate (CCRa) rises to the explicit cell rate (5M) calculated in the previous second (3), the minimum explicit cell rates remain unchanged. As explicit cell rates, the first connection (a)

receives its current cell rate (5M), and the second connection (b) receives its minimum explicit cell rate (3.33M).

In the fifth second (5), when the input rate (IRb) of the second connection (b) rises to 5M, its current cell rate (CCRb) rises to the explicit cell rate (3.33M) calculated in the previous second (4). Since the current cell rates of the first and third connections (a, c) are still 5M and 3M, respectively, the total current cell rate exceeds the group bandwidth Bg (5M+3.33M+3M=11.33M>10M). The explicit cell rates of all the connections are therefore reduced to the minimum explicit cell rates. These minimum explicit cell rates (1.67M, 3.33M, 5M, 6.67M) are the same as in the previous second (4).

In the sixth second, the current cell rates of the first two connections (a, b) are reduced to the explicit cell rates calculated in the previous second (5). Accordingly, CCRa becomes 1.67M and CCRb becomes 3.33M, while CCRc remains 3M. The total current cell rate is now only 8M, leaving 2M free to be reapportioned. This amount is added to the current cell rates of the first three connections (a, b, c) to produce explicit cell rates of 3.67M, 5.33M, and 5M for these connections.

In the seventh second (7), the current cell rate of the first connection (a) rises to the explicit cell rate (3.67M) calculated in the previous second (6), while the current cell rates of the second and third connection (b, c) remain 3.33M and 3M. The total current cell rate is now equal to the group bandwidth Bg (3.67M+3.33M+3M=10M). Since there is neither an excess nor a deficit of bandwidth, the explicit cell rates of the active connections (a, b, c) remain unchanged.

As long as there are no further changes in the input rates, the condition in the seventh second (7) will continue, with all three active connections (a) receiving approximately equal explicit cell rates. This is obviously fairer than the condition at the end of FIG. 6, in which the first connection (a) was receiving 5M while the second connection (b) received only 2M. The improved fairness is a result of the recalculation of minimum explicit cell rates in the third second (3).

The foregoing description assumes that the excess 2M of bandwidth in the sixth second (6) in FIG. 7 is seized by the first connection (a) before it can be taken by the second connection (b), because the RM cell for the first connection is processed before the RM cell for the second connection. If the reverse is true and the second connection (b) gets the excess bandwidth, the resulting current cell rates in the seventh second (7) will be CCRa=2M, CCRb=5M, CCRc=3M, and CCRd=0M, while the explicit cell rates will be ECRa=2M, ECRb=5M, ECRc=5M, ECRd=6.67M. This division of bandwidth is also fair; the second connection (b) receives more bandwidth than the first connection (a) because its minimum cell rate (2M) is twice as great as the minimum cell rate (1M) of the first connection.

Next, a second embodiment will be described. The second embodiment has the same structure as the first embodiment, illustrated in FIG. 1, but the explicit cell rate calculation unit 20 uses a different method to calculate the explicit cell rates.

In the second embodiment, the minimum explicit cell rate of an active connection is calculated by the following equation (7).

$$ECR0i = (MCRi/\Sigma MCR_{active})*Bg \quad (7)$$

This equation (7) is the same as equation (4) in the first embodiment. The minimum explicit cell rate of an inactive connection is calculated by the following equation (8).

$$ECR0i = (MCRi/(\Sigma MCR_{active}+MCRi))*Bg \quad (8)$$

In both equations (7) and (8), the sum $\Sigma MCR_{active}$ is the sum of the minimum cell rates of the active connections.

In the second embodiment, the minimum explicit cell rates of inactive connections are reduced in relation to the minimum explicit cell rates of active connections. They are reduced because the minimum explicit cell rate of an active connection is calculated as if the connection were active, thereby increasing the denominator in the division operation. As a result, when an inactive connection actually does become active, the disruptive effect on the explicit cell rates of the other active connections is reduced.

FIG. 8 shows an example of the operation of the second embodiment with the same ABR connection group and the same input rates as in FIG. 7. The only difference between FIG. 7 and FIG. 8 is that in FIG. 8, from the third second (3) onward, the second embodiment sets the minimum explicit cell rate and the explicit cell rate of the inactive fourth connection (d) to four megabits per second (4M). Accordingly, if this connection (d) becomes active later, it cannot immediately send more than four megabits of cell traffic per second into the switching apparatus 13. In the first embodiment, it would be allowed to send up to 6.67 megabits per second. Compared with the first embodiment, accordingly, the second embodiment reduces the amount of temporary congestion that can occur when a previously inactive connection becomes active.

The second embodiment provides the same enhanced fairness as the first embodiment, and also improves the behavior of the system during inactive-to-active connection status transitions.

Next, a third embodiment will be described. The third embodiment divides the ABR connection group into logical subgroups.

Figure 9:
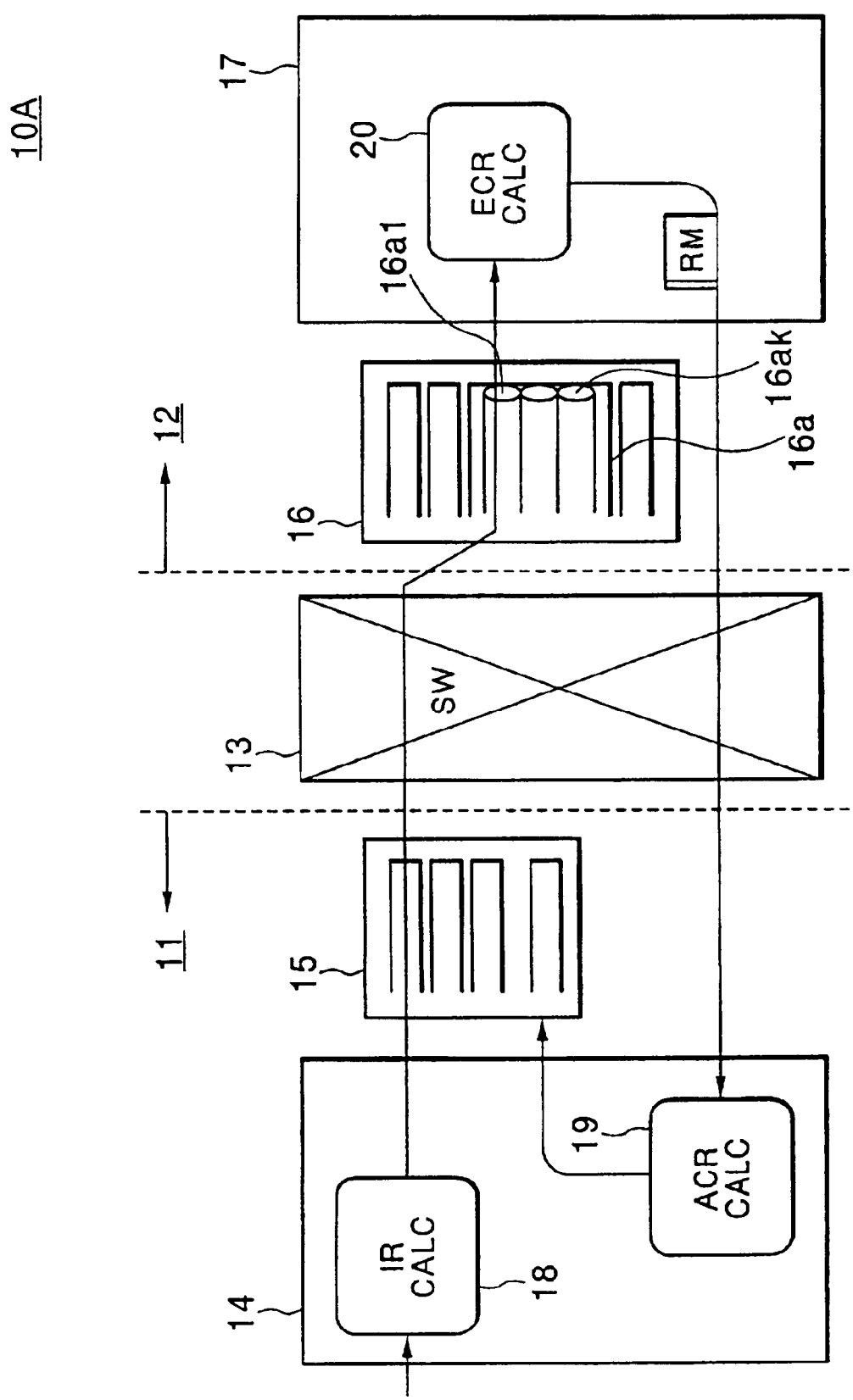
FIG. 9 is a block diagram of another ATM switch embodying the present invention.

Referring to FIG. 9, the second embodiment is an ATM switch 10A with the same input line interface 11 and switching apparatus 13 as in the first embodiment. In the output line interface 12, the virtual path shaper 16 is similar to the virtual path shaper 16 in the first embodiment, with a single ABR queue 16a. Although the ABR cells in this queue may belong to different subgroups, they are enqueued and dequeued without regard to the subgroups to which they belong. The significance of the subgroups is that the ABR group bandwidth Bg is divided among the subgroups so that the j-th subgroup has its own subgroup bandwidth allocation Bgj (j is a positive integer identifying the group). These subgroup bandwidth allocations are indicated in the drawing by logical pipelines 16a1, . . . , 16ak, where k is the number of subgroups.

The explicit cell rate calculation unit 20 is similar to the explicit cell rate calculation unit 20 in the preceding embodiments, but follows a slightly different calculation procedure.

For connection i in subgroup j, the explicit cell rate calculation unit 20 calculates a minimum explicit cell rate ECR0ij that gives this connection a fair share of the subgroup bandwidth Bgj, taking account of the activity and inactivity of the connections in subgroup j. This fair share may be calculated by equation (4) as in the first embodiment, for example, or by equations (7) and (8) as in the second embodiment. In either case, the sum $\Sigma MCR_{active}$ used in the calculation is taken over the active connections in subgroup j.

The explicit cell rate ECRij of connection i in subgroup j is then calculated by the following procedure (10), in which $\Sigma CCRj$ is the total current cell rate of all connections in subgroup j and, as noted above, Bgj is the bandwidth allocated to subgroup j.

$$ECRij = CCRij + (Bgj - \Sigma CCRj) \quad (10)$$

if $(Bgj < \Sigma CCRj)$ $\quad ECRij = ECR0ij$ else $\quad$ if $(ECRij < ECR0ij)$ $\quad\quad ECRij = ECR0ij$ $\quad$ else $\quad\quad ECRij = ECRij$ In other words, the explicit cell rate calculation unit 20 follows the procedure given in the flowchart in FIG. 5, except that it restricts its attention to subgroup j and uses the subgroup bandwidth Bgj instead of the group bandwidth Bg.

The third embodiment provides the same advantages as the preceding embodiments in achieving a more fair division of bandwidth by taking connection activity into account. In addition, the third embodiment enables the ATM switch 10A to provide different levels of service to different subgroups of ABR connections, by allocating different bandwidths to the subgroups, without having to manage a separate queue for each subgroup in the virtual path shaper 16.

In the embodiments above, RM cells are returned from a single output line interface 12 to a single input line interface 11 in an ATM switch, but there may be multiple input line interfaces 11, multiple output line interfaces 12, or multiple line interfaces of both types.

The ABR traffic control loop in the embodiments above operates within a single ATM switch, but the invention can also be applied to other control loops, such as a loop between a source node and an ATM switch, in which the ATM switch acts as a virtual destination, or a loop between an ATM switch and a destination node, in which the ATM switch acts as a virtual source.

The invention is not restricted to traffic management of ABR service in an ATM network, but can be practiced in any type of communication network that assigns a bandwidth for combined use by a group of connections and assigns minimum bandwidths to the individual connections in the group.

Those skilled in the art will recognize that further variations are possible within the scope claimed below.

What is claimed is:

1. A method of controlling bandwidth usage by a group of connections in a communication network, the group of connections having an assigned group bandwidth, the connections in the group having respective minimum bandwidths providable within the assigned group bandwidth and respective current bandwidths that the connections are currently allowed to use, the method comprising the steps of:

(a) calculating a total current bandwidth by adding up the current bandwidths of the connections in the group;

(b) calculating a difference by subtracting the total current bandwidth from the assigned group bandwidth;

(c) calculating an explicit rate for one connection in the group by adding said difference to the connection's current bandwidth;

(d) determining which connections in the group are currently active;

(e) calculating a sum of the minimum bandwidths of the active connections in the group;

(f) using said sum to calculate a minimum explicit rate for said one connection;

(g) altering said explicit rate to said minimum explicit rate under certain conditions; and (h) controlling the current bandwidth of said one connection according to said explicit rate.

2. The method of claim 1, wherein said step (g) includes altering the explicit rate to the minimum explicit rate if the explicit rate is less than the minimum explicit rate.

3. The method of claim 1, wherein said step (g) includes altering the explicit rate to the minimum explicit rate if said difference is negative.

4. The method of claim 1, wherein said step (f) includes the further step of dividing the minimum bandwidth of said one connection by said sum, thereby obtaining a quotient.

5. The method of claim 4, wherein said step (f) includes the further step of multiplying the assigned group bandwidth by said quotient.

6. The method of claim 1, wherein the minimum explicit rate is calculated in said step (f) in one way if said one connection is active and another way if said one connection is inactive.

7. The method of claim 1, wherein the sum used in said step (f) includes the minimum bandwidth of said one connection, even if said one connection is currently inactive.

8. A cell receiving apparatus in a communication network supporting communication by transmission of cells on a group of connections, the group having an assigned group bandwidth, the connections in the group having respective minimum bandwidths providable within the assigned group bandwidth and respective current bandwidths that the connections are currently allowed to use, the cell receiving apparatus including:

an explicit rate calculation unit that receives information indicating the current bandwidths of the connections, calculates a total current bandwidth by adding up the current bandwidths of the connections in the group, subtracts the total current bandwidth from the assigned group bandwidth to obtain a difference, adds the difference to each connection's current bandwidth to obtain an explicit rate for each connection in the group, determines which connections in the group are currently active, calculates a sum of minimum bandwidths of active connections in the group, uses said sum to calculate a minimum explicit rate for each connection in the group, and alters the explicit rate to the minimum explicit rate under certain conditions;

wherein the explicit rate of each connection in the group is used to control the current bandwidth of the connection.

9. The cell receiving apparatus of claim 8, wherein the explicit rate calculation unit alters the explicit rate to the minimum explicit rate if the explicit rate is less than the minimum explicit rate.

10. The cell receiving apparatus of claim 8, wherein the explicit rate calculation unit alters the explicit rate to the minimum explicit rate if said difference is negative.

11. The cell receiving apparatus of claim 8, wherein in calculating the minimum explicit rate of each said connection, the explicit rate calculation unit divides the connection's minimum bandwidth by said sum, thereby obtaining a quotient.

12. The cell receiving apparatus of claim 11, wherein in calculating the minimum explicit rate of each said connection, the explicit rate calculation unit multiplies the assigned group bandwidth by said quotient.

13. The cell receiving apparatus of claim 8, wherein the explicit rate calculation unit calculates the minimum explicit rate of active connections in one way and calculates the minimum explicit rate of inactive connections in another way.

14. The cell receiving apparatus of claim 8, wherein said sum includes the minimum bandwidth of the connection for which the minimum explicit rate is being calculated, even if the connection is currently inactive.

15. The cell receiving apparatus of claim 8, further comprising a traffic shaping unit that enqueues cells belonging to a plurality of groups of connections in a single queue, each group of connections in the plurality of groups having its own assigned group bandwidth, the explicit rate calculation unit calculating explicit rates for the connections in each group separately.

16. A traffic control system comprising:
the cell receiving apparatus of claim 8; and
a cell transmitting apparatus that transmits cells to the cell receiving apparatus on each connection in said group in accordance with the explicit rate calculated by the explicit rate calculation unit.

17. The traffic control system of claim 16, further comprising a switching apparatus disposed between the cell transmitting apparatus and the cell receiving apparatus.

18. The traffic control system of claim 17, wherein the cell transmitting apparatus functions as an input line interface for the switching apparatus, and the cell receiving apparatus functions as an output line interface for the switching apparatus.

19. A method of controlling bandwidth usage by a group of connections in a communication network, the group of connections having an assigned group bandwidth, the connections in the group having respective minimum bandwidths providable within the assigned group bandwidth and respective current bandwidths that the connections are currently allowed to use, the method comprising the steps of:
(a) calculating a total current bandwidth by adding up the current bandwidths of the connections in the group;
(b) calculating a difference by subtracting the total current bandwidth from the assigned group bandwidth;
(c) calculating an explicit rate for one connection in the group by adding said difference to the connection's current bandwidth;
(d) calculating a minimum explicit rate for said one connection;
(e) altering said explicit rate to said minimum explicit rate if said difference is negative; and
(f) controlling the current bandwidth of said one connection according to said explicit rate.

20. The method of claim 19, further including the step of altering the explicit rate to the minimum explicit rate if the explicit rate is less than the minimum explicit rate.

21. The method of claim 20, wherein said step (d) includes determining which connections in the group are currently active.

22. The method of claim 21, wherein the minimum explicit rate is calculated in said step (d) in one way if said one connection is active and another way if said one connection is inactive.

23. The method of claim 21, wherein said step (d) further includes the steps of:
calculating a sum of the minimum bandwidths of the active connections in the group;
dividing the minimum bandwidth of said one connection by said sum, thereby obtaining a quotient; and
multiplying the assigned group bandwidth by said quotient.

24. The method of claim 23, wherein said sum includes the minimum bandwidth of said one connection, even if said one connection is currently inactive.

25. A cell receiving apparatus in a communication network supporting communication by transmission of cells on a group of connections, the group having an assigned group bandwidth, the connections in the group having respective minimum bandwidths providable within the assigned group bandwidth and respective current bandwidths that the connections are currently allowed to use, the cell receiving apparatus including:
an explicit rate calculation unit that receives the current bandwidths of the connections, calculates a total current bandwidth by adding up the current bandwidths of the connections in the group, subtracts the total current bandwidth from the assigned group bandwidth to obtain a difference, adds the difference to each connection's current bandwidth to obtain an explicit rate for each connection in the group, calculates a minimum explicit rate for each connection in the group, and alters the explicit rate to the minimum explicit rate if said difference is negative;
wherein the explicit rate of each connection in the group is used to control the current bandwidth of the connection.

26. The cell receiving apparatus of claim 25, wherein the explicit rate calculation unit also alters the explicit rate to the minimum explicit rate if the explicit rate is less than the minimum explicit rate.

27. The cell receiving apparatus of claim 26, wherein the explicit rate calculation unit determines which connections in the group are currently active.

28. The cell receiving apparatus of claim 27, wherein the explicit rate calculation unit calculates the minimum explicit rate of active connections in one way and calculates the minimum explicit rate of inactive connections in another way.

29. The cell receiving apparatus of claim 27, wherein the explicit rate calculation unit calculates a sum of the minimum bandwidths of the active connections in the group, divides each connection's minimum bandwidth by said sum, thereby obtaining a quotient, and multiplies the assigned group bandwidth by the quotient to obtain the minimum explicit rate of the connection.

30. The cell receiving apparatus of claim 29, wherein said sum includes the minimum bandwidth of th e connection for which the minimum explicit rate is being calculated, even if the connection is currently inactive.

31. The cell receiving apparatus of claim 25, further comprising a traffic shaping unit that enqueues cells belonging to a plurality of groups of connections in a single queue, each group of connections in the plurality of groups having its own assigned group bandwidth, the explicit rate calculation unit calculating explicit rates for the connections in each group separately.

32. A traffic control system comprising:
the cell receiving apparatus of claim 25; and
a cell transmitting apparatus that transmits cells to the cell receiving apparatus on each connection in said group in accordance with the explicit rate calculated by the explicit rate calculation unit.

33. The traffic control system of claim 32, further comprising a switching apparatus disposed between the cell transmitting apparatus and the cell receiving apparatus.

34. The traffic control system of claim 33, wherein the cell transmitting apparatus functions as an input line interface for the switching apparatus, and the cell receiving apparatus functions as an input line interface for the switching apparatus.

* * * * *